(12) United States Patent (10) Patent No.: US 11,424,628 B2
Tsai (45) Date of Patent: Aug. 23, 2022

(54) BALANCE CHARGING METHOD AND CHARGING DEVICE FOR CHARGING MULTIPLE BATTERY CELLS

(71) Applicant: Acer Incorporated, New Taipei (TW)

(72) Inventor: Chin-Yi Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 146 days.

(21) Appl. No.: 16/796,950

(22) Filed: Feb. 21, 2020

(65) Prior Publication Data

US 2021/0203169 A1 Jul. 1, 2021

(30) Foreign Application Priority Data

Dec. 25, 2019 (TW) .................................. 108147543

(51) Int. Cl.
*H02J 7/00* (2006.01)
(52) U.S. Cl.
CPC .......... *H02J 7/0014* (2013.01); *H02J 7/0018* (2013.01); *H02J 7/0047* (2013.01)
(58) Field of Classification Search
CPC ...... H02J 7/0014; H02J 7/0018; H02J 7/0047; H01M 2010/4271; H01M 10/441
USPC .......................................................... 320/134
See application file for complete search history.

(56) References Cited

U.S. PATENT DOCUMENTS

| | | | | |
|---|---|---|---|---|
| 9,190,853 | B2* | 11/2015 | Johnson | ................ H02J 7/0014 |
| 2013/0335036 | A1 | 12/2013 | Zhang et al. | |
| 2015/0229142 | A1 | 8/2015 | Takahashi et al. | |
| 2016/0233698 | A1* | 8/2016 | Gong | ..................... H02J 7/0016 |
| 2018/0366959 | A1* | 12/2018 | Coenen | ................. H02J 7/0029 |
| 2021/0098997 | A1* | 4/2021 | Bunnell | .................. B60L 58/22 |
| 2022/0014028 | A1* | 1/2022 | Furman | ................. H02J 7/0068 |

FOREIGN PATENT DOCUMENTS

| | | |
|---|---|---|
| CN | 108110844 | 6/2018 |
| EP | 1814206 | 8/2007 |
| TW | 201351839 | 12/2013 |
| TW | 201815008 | 4/2018 |

OTHER PUBLICATIONS

"Search Report of Europe Counterpart Application", dated Apr. 24, 2020, p. 1-p. 9.

* cited by examiner

*Primary Examiner* — Richard Isla
*Assistant Examiner* — Manuel Hernandez
(74) *Attorney, Agent, or Firm* — JCIPRNET

(57) ABSTRACT

A balance charging method and a charging device are provided. The method includes: obtaining a voltage parameter of a plurality of battery cells; determining a control parameter set according to a first value relationship between the voltage parameter and a plurality of first threshold values, wherein the control parameter set includes a plurality of second threshold values; determining a charging rule of balance charging according to a second value relationship between the voltage parameter and the second threshold values; and performing the balance charging on the battery cells according to the charging rule.

6 Claims, 5 Drawing Sheets

BALANCE CHARGING METHOD AND CHARGING DEVICE FOR CHARGING MULTIPLE BATTERY CELLS

CROSS-REFERENCE TO RELATED APPLICATION

This application claims the priority benefit of Taiwan application serial no. 108147543, filed on Dec. 25, 2019. The entirety of the above-mentioned patent application is hereby incorporated by reference herein and made a part of this specification.

BACKGROUND

Technical Field

The disclosure relates to a charging technique, and more particularly, to a balance charging method and a charging device.

Related Art

In most of the currently commercially available lithium battery products, a plurality of single battery cells are connected in series and/or in parallel to form a battery pack to meet power supply requirements. After a plurality of charging and discharging operations, the battery cells in one battery pack may have different voltages, resulting in battery imbalance. If the battery imbalance continues, the battery life may be shortened. Therefore, some manufacturers have proposed battery balancing techniques to perform balance charging on a plurality of battery cells. However, the current battery balancing techniques may still have the following problems. For example, when the entire battery pack is fully charged (full power), some of the battery cells may still be far from the full power state. Or, if the battery is often used without being fully charged, the battery balancing techniques may never be activated because the voltage of the entire battery pack never reaches the minimum start voltage.

SUMMARY

The disclosure provides a balance charging method and a charging device, in which balance charging requirements in various voltage states can be met by setting a plurality of threshold values and a plurality of sets of control parameters.

An embodiment of the disclosure provides a balance charging method for performing balance charging on a plurality of battery cells. The balance charging method includes the following. A voltage parameter of the plurality of battery cells is obtained. A control parameter set is determined according to a first value relationship between the voltage parameter and a plurality of first threshold values, wherein the control parameter set includes a plurality of second threshold values. A charging rule of the balance charging is determined according to a second value relationship between the voltage parameter and the plurality of second threshold values. The balance charging is performed on the plurality of battery cells according to the charging rule.

An embodiment of the disclosure further provides a charging device including a charging circuit and a charging management circuit. The charging circuit is coupled to a plurality of battery cells. The charging management circuit is coupled to the charging circuit. The charging management circuit is configured to obtain a voltage parameter of the plurality of battery cells. The charging management circuit is further configured to determine a control parameter set according to a first value relationship between the voltage parameter and a plurality of first threshold values, wherein the control parameter set includes a plurality of second threshold values. The charging management circuit is further configured to determine a charging rule of balance charging according to a second value relationship between the voltage parameter and the plurality of second threshold values. The charging management circuit is further configured to control the charging circuit to perform the balance charging on the plurality of battery cells according to the charging rule.

Based on the above, after a voltage parameter of a plurality of battery cells is obtained, a control parameter set including a plurality of second threshold values is determined according to a first value relationship between the voltage parameter and a plurality of first threshold values. Next, a charging rule of balance charging is determined according to a second value relationship between the voltage parameter and the plurality of second threshold values. After the charging rule of balance charging is determined, the balance charging is performed on the plurality of battery cells according to the charging rule. Thereby, the technical problems existing in conventional battery balancing are effectively eliminated and/or the battery life is increased.

DESCRIPTION OF THE EMBODIMENTS

Figure 1:
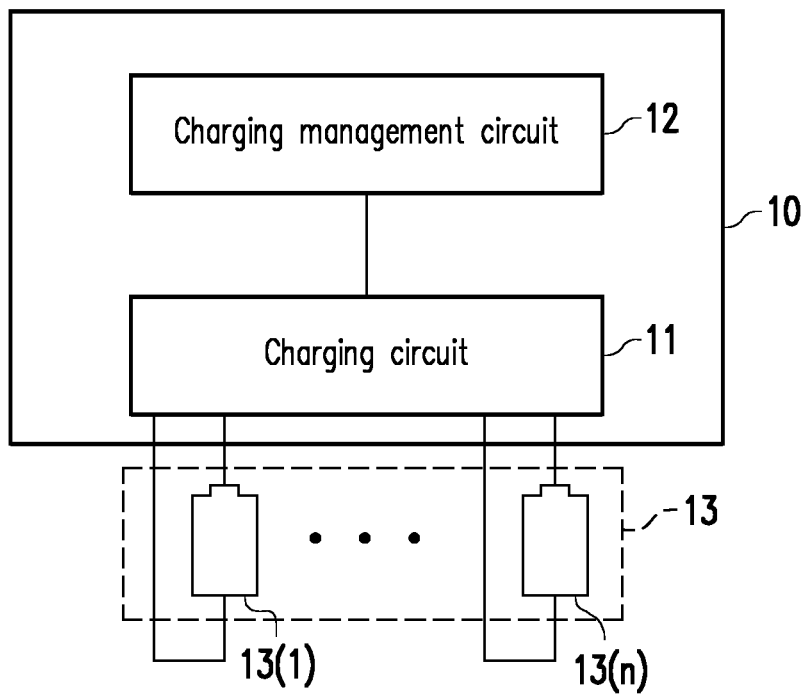
FIG. 1 illustrates a schematic diagram of a charging device according to an embodiment of the disclosure.

FIG. 1 illustrates a schematic diagram of a charging device according to an embodiment of the disclosure. Referring to FIG. 1, a charging device 10 includes a charging circuit 11 and a charging management circuit 12. The charging circuit 11 is coupled to the charging management circuit 12 and a battery pack 13. According to a voltage state of a plurality of battery cells 13(1) to 13(n) in the battery pack 13, the charging management circuit 12 controls the charging circuit 11 to perform general charging or balance charging on the battery cells 13(1) to 13(n). For example, in the general charging, the charging circuit 11 charges the battery cells 13(1) to 13(n) uniformly. However, in the balance charging, one or more of the battery cells 13(1) to 13(n) that have a relatively high voltage may be temporarily skipped and not charged. Therefore, when one or more of the battery cells 13(1) to 13(n) have a relatively low voltage as compared to the other battery cells, the charging circuit 11 gradually increases the voltage of the battery cells with the relatively low voltage by balance charging. It should be noted that the disclosure does not limit the total number of the battery cells 13(1) to 13(n).

The charging circuit 11 receives external power supply and converts the external power supply into charging power for a battery pack. The charging management circuit 12 may include any programmable general purpose or special purpose microprocessor, a digital signal processor (DSP), a programmable controller, an application specific integrated circuit (ASIC), a programmable logic device (PLD), other similar device or a combination of the foregoing devices. In one embodiment, the charging management circuit 12 is also referred to as a charging management chip.

The charging device 10 may be installed in any electronic device that can be used in charging the battery pack 13, for example, a smartphone, a tablet, a notebook, an e-book or the like. In addition, the charging device 10 may also include various external charging devices. In the following embodiment, an example is given in which the battery cells 13(1) to 13(n) in the battery pack 13 are lithium batteries. However, in other embodiments, the battery cells 13(1) to 13(n) may include other types of rechargeable battery cells, and the disclosure is not limited thereto.

When the charging device 10 is operating, the charging management circuit 12 obtains a voltage parameter of the battery cells 13(1) to 13(n). In one embodiment, the voltage parameter reflects a voltage (or total voltage) of the battery pack 13. In one embodiment, the voltage parameter reflects an average voltage of the battery cells 13(1) to 13(n). For example, assuming that the total number of the battery cells 13(1) to 13(n) is n and the voltage of the battery pack 13 is V(T), the voltage parameter may be V(1) or V(2), wherein V(1) may be equal to V(T), and V(2) may be equal to V(T)/n.

In one embodiment, the charging management circuit 12 measures the voltage of the battery pack 13 in real time and obtains the voltage parameter of the battery cells 13(1) to 13(n) according to the foregoing voltage. Alternatively, in one embodiment, the charging management circuit 12 reads the voltage of the battery pack 13 after the previous charging from a storage medium (for example, a memory). For example, each time the battery pack 13 is charged, the charging management circuit 12 records the current voltage of the battery pack 13 in a management table. The next time the battery pack 13 is charged, the charging management circuit 12 reads from the management table the voltage of the battery pack 13 after the previous charging and obtains the voltage parameter of the battery cells 13(1) to 13(n) according to the foregoing voltage.

After obtaining the voltage parameter of the battery cells 13(1) to 13(n), the charging management circuit 12 determines a control parameter set according to a value relationship (also referred to as a first value relationship) between the voltage parameter and a plurality of threshold values (also referred to as first threshold values). The control parameter set also includes a plurality of threshold values (also referred to as second threshold values). Then, the charging management circuit 12 determines a charging rule of balance charging according to a value relationship (also referred to as a second value relationship) between the voltage parameter and the plurality of second threshold values. Next, the charging management circuit 12 controls the balance charging to be performed on the battery cells 13(1) to 13(n) according to the determined charging rule.

In other words, by setting a plurality of threshold values and a plurality of sets of control parameters, the charging management circuit 12 controls the charging circuit 11 to perform balance charging on the battery cells 13(1) to 13(n) according to the dynamically determined charging rule, so as to meet balance charging requirements of the battery cells 13(1) to 13(n) in various voltage states.

Figure 2:
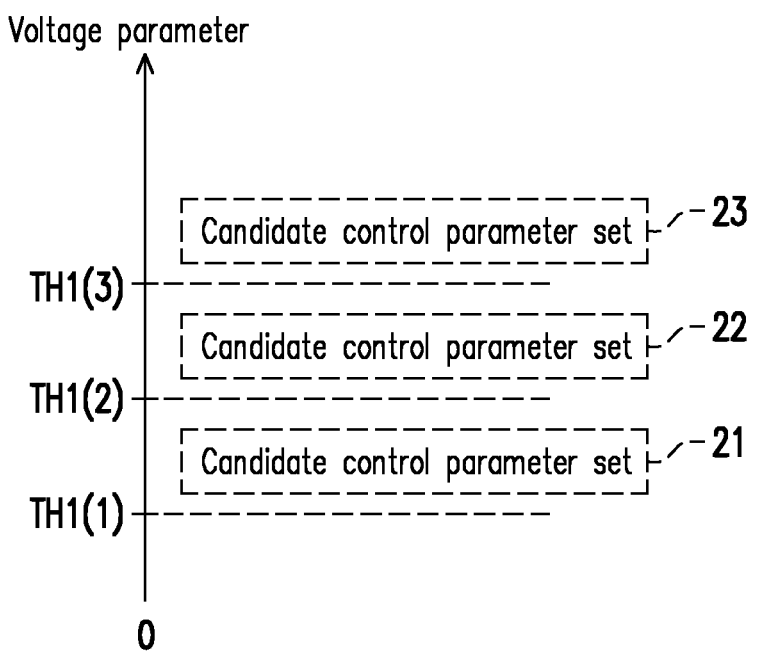
FIG. 2 illustrates a schematic diagram of determining a control parameter set according to an embodiment of the disclosure.

FIG. 2 illustrates a schematic diagram of determining a control parameter set according to an embodiment of the disclosure. Referring to FIG. 1 and FIG. 2, it is assumed that the first threshold values include threshold values TH1(1) to TH1(3). The threshold value TH1(3) is greater than the threshold value TH1(2) and the threshold value TH1(2) is greater than the threshold value TH1(1). The charging management circuit 12 compares the voltage parameter of the battery cells 13(1) to 13(n) with the threshold values TH1(1) to TH1(3), and, according to a comparison result (also referred to as a first comparison result), selects one of a plurality of candidate control parameter sets 21 to 23 as a control parameter set to be applied.

In one embodiment, if the first comparison result reflects that the value of the voltage parameter is between the threshold values TH1(1) and TH1(2), the charging management circuit 12 selects the candidate control parameter set 21 as the control parameter set to be applied. In one embodiment, if the first comparison result reflects that the value of the voltage parameter is between the threshold values TH1(2) and TH1(3), the charging management circuit 12 selects the candidate control parameter set 22 as the control parameter set to be applied. In one embodiment, if the first comparison result reflects that the value of the voltage parameter is greater than the threshold value TH1 (3), the charging management circuit 12 selects the candidate control parameter set 23 as the control parameter set to be applied. Alternatively, in one embodiment, if the first comparison result reflects that the value of the voltage parameter is smaller than the threshold value TH1(1), the charging management circuit 12 controls the charging circuit 11 to perform the above-mentioned general charging on the battery cells 13(1) to 13(n).

Figure 3A:
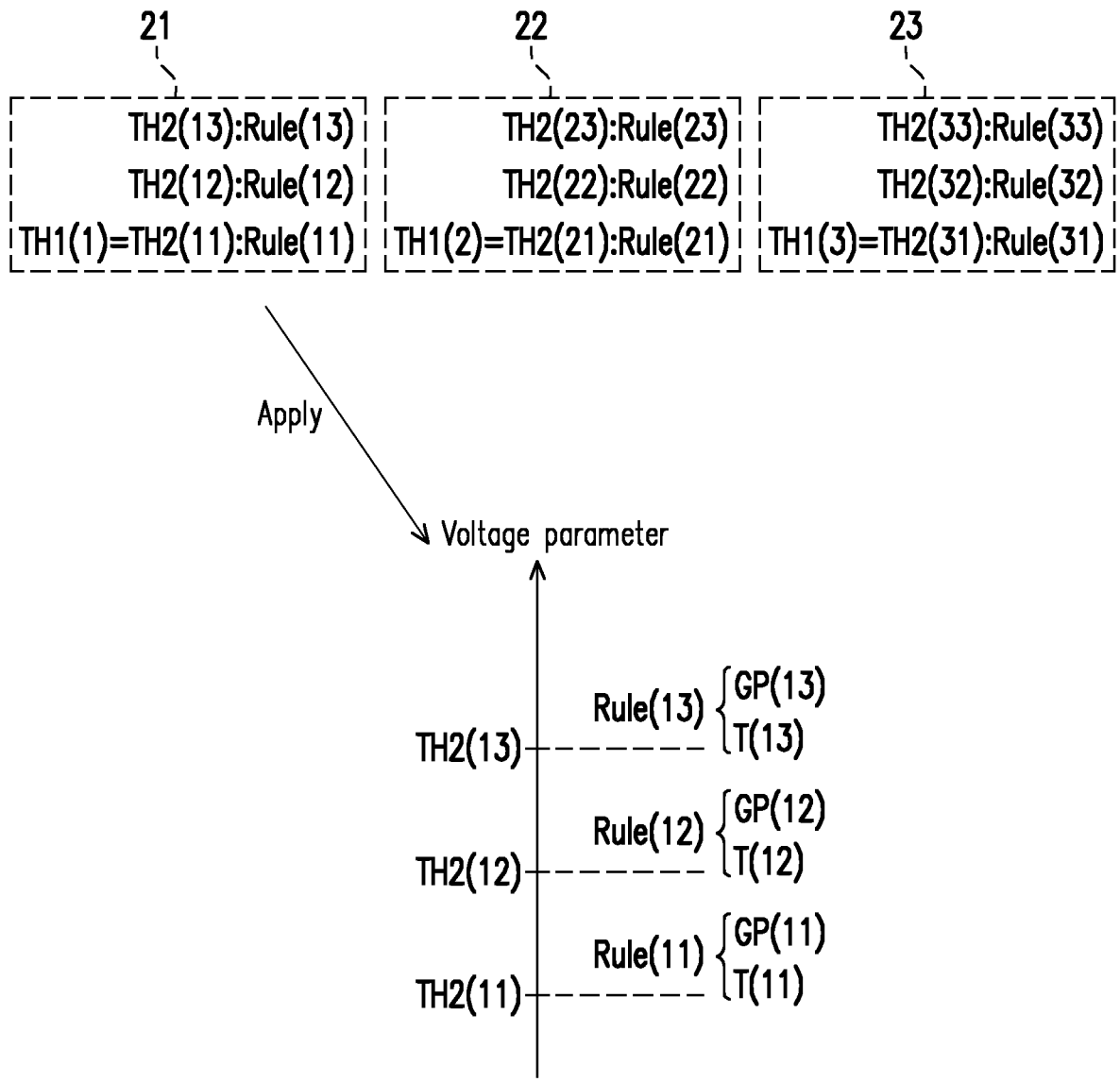
FIG. 3A to FIG. 3C illustrate schematic diagrams of performing balance charging according to different candidate control parameter sets according to several embodiments of the disclosure.
Figure 3B:
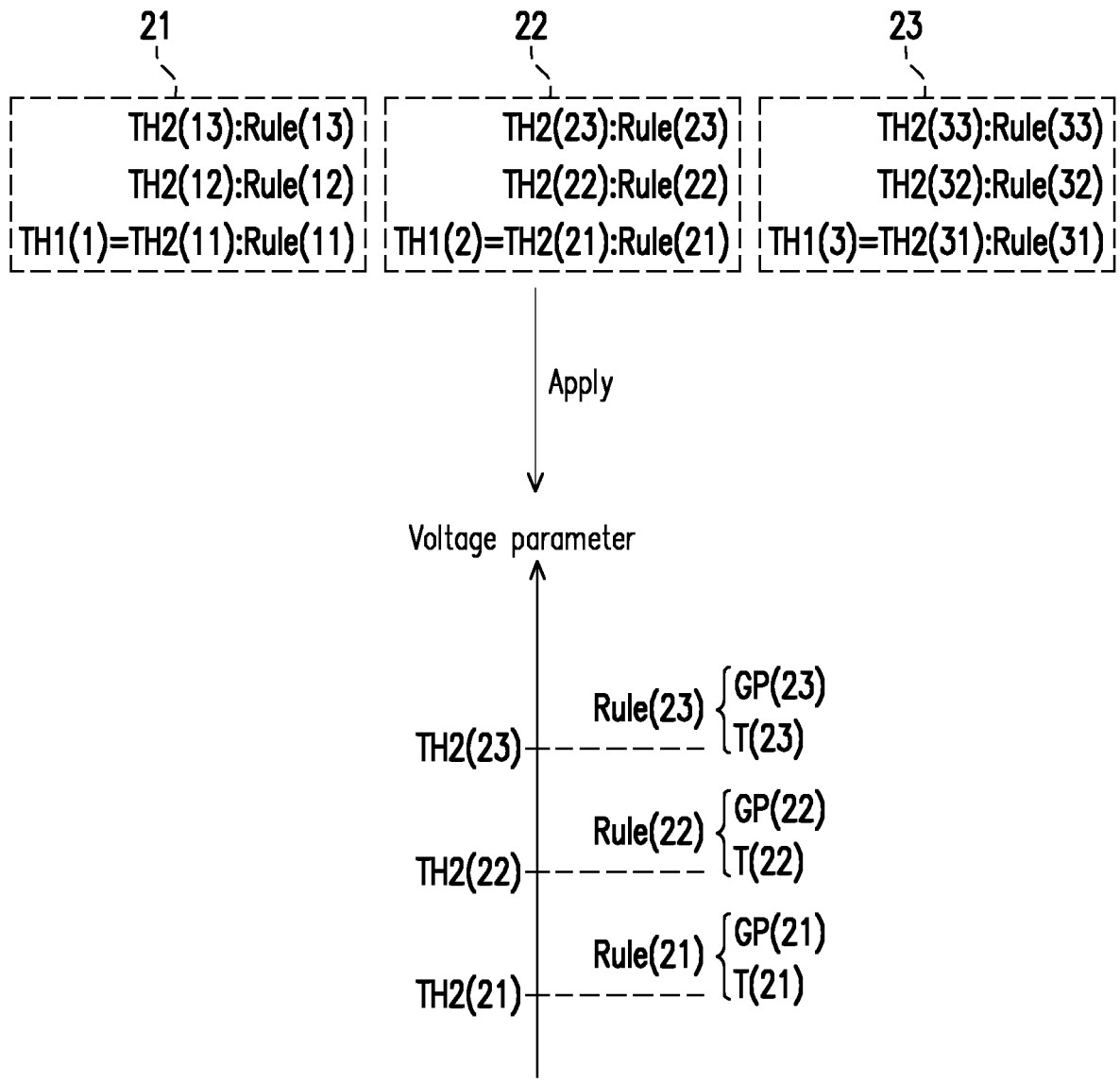
Figure 3C:
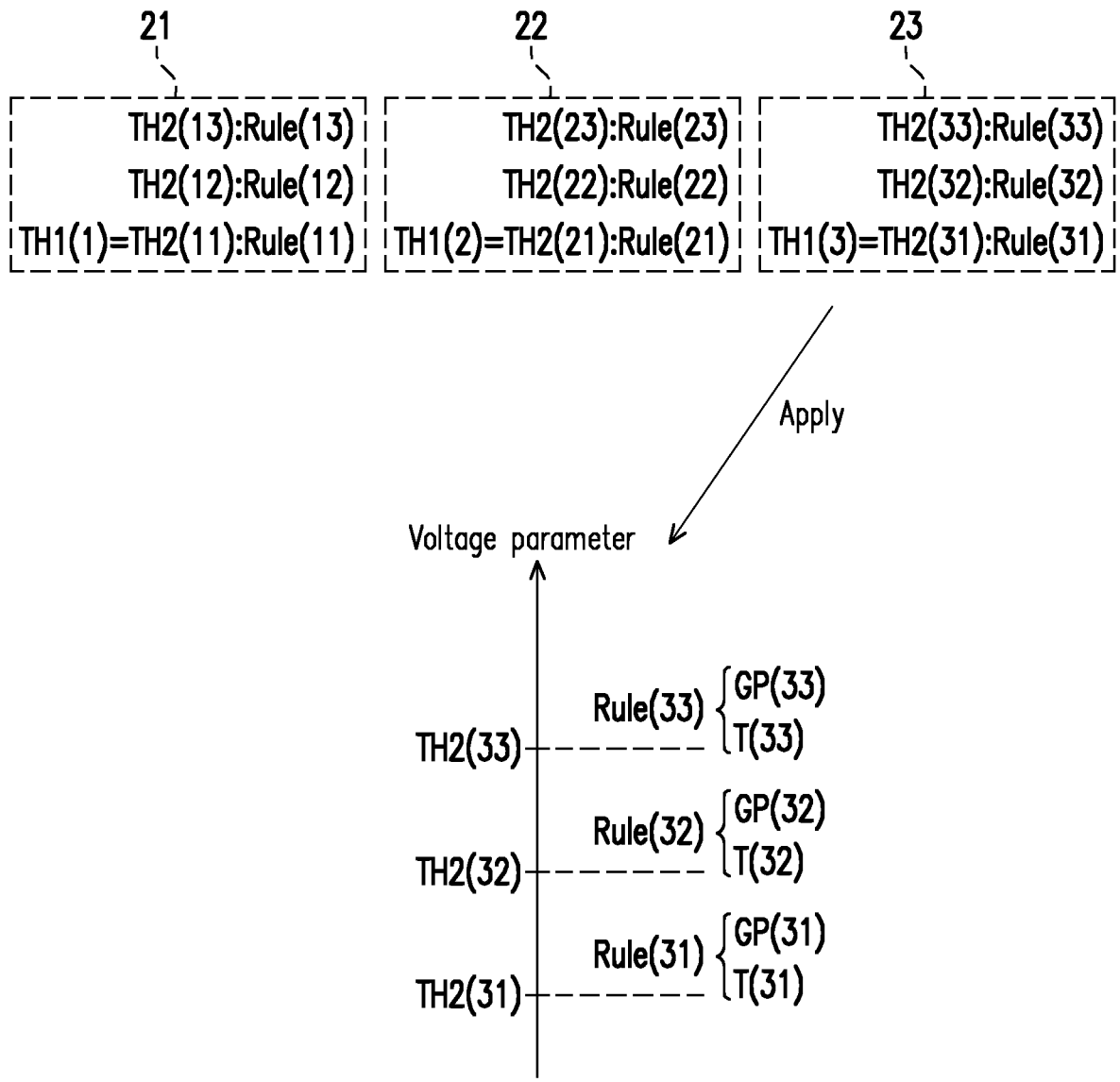

FIG. 3A to FIG. 3C illustrate schematic diagrams of performing balance charging according to different candidate control parameter sets according to several embodiments of the disclosure. Referring to FIG. 1 and FIG. 3A, in one embodiment, it is assumed that the candidate control parameter set 21 is selected as the control parameter set to be applied. After the candidate control parameter set 21 is applied, the charging management circuit 12 compares the voltage parameter of the battery cells 13(1) to 13(n) with a plurality of threshold values TH2(11) to TH2(13), and, according to a comparison result (also referred to as a second comparison result), selects one of a plurality of candidate charging rules Rule(11) to Rule(13) as a charging rule of balance charging to be used. The threshold value TH2(13) is greater than the threshold value TH2(12) and the threshold value TH2(12) is greater than the threshold value TH2(11).

In one embodiment, if the second comparison result reflects that the value of the voltage parameter is between the threshold values TH2(11) and TH2(12), the charging management circuit 12 selects the candidate charging rule Rule (11) as the charging rule to be used. In one embodiment, if the second comparison result reflects that the value of the voltage parameter is between the threshold values TH2(12) and TH2(13), the charging management circuit 12 selects the candidate charging rule Rule(12) as the charging rule to be used. In one embodiment, if the second comparison result reflects that the value of the voltage parameter is greater than the threshold value TH2(13), the charging management circuit 12 selects the candidate charging rule Rule(13) as the charging rule to be used.

In one embodiment, each charging rule is defined by at least one charging control parameter. For example, the at least one charging control parameter includes at least a first charging control parameter and/or a second charging control parameter. The first charging control parameter reflects a start condition for the balance charging to be performed, and the second charging control parameter reflects execution time of the balance charging to be performed.

Taking FIG. 3A as an example, the candidate charging rule Rule(11) is defined by at least charging control parameters GP(11) and T(11), the candidate charging rule Rule(12) is defined by at least charging control parameters GP(12) and T(12), and the candidate charging rule Rule(13) is defined by at least charging control parameters GP(13) and T(13). The charging control parameters GP(11), GP(12) and GP(13) reflect the start conditions for the balance charging to be performed, and the charging control parameters T(11), T(12) and T(13) reflect the execution time of the balance charging to be performed.

If the candidate charging rule Rule(11) is selected as the charging rule to be used, the charging control parameters GP(11) and T(11) are applied. If the candidate charging rule Rule(12) is selected as the charging rule to be used, the charging control parameters GP(12) and T(12) are applied. If the candidate charging rule Rule(13) is selected as the charging rule to be used, the charging control parameters GP(13) and T(13) are applied.

In one embodiment, it is assumed that the charging control parameters GP(11), GP(12) and GP(13) are 90 millivolts (mV), 80 mV and 70 my, respectively, and the charging control parameters T(11), T(12) and T(13) are 10 seconds, 15 seconds and 20 seconds, respectively. If the candidate charging rule Rule(11) is selected as the charging rule to be used, when any two of the battery cells 13(1) to 13(n) have a voltage difference greater than 90 mV (that is, GP(11)), the balance charging is activated so that the balance charging is performed on the battery cells 13(1) to 13(n), and this balance charging lasts for 10 seconds (that is, T(11)). If the candidate charging rule Rule(12) is selected as the charging rule to be used, when any two of the battery cells 13(1) to 13(n) have a voltage difference greater than 80 mV (that is, GP(12)), the balance charging is activated so that the balance charging is performed on the battery cells 13(1) to 13(n), and this balance charging lasts for 15 seconds (that is, T(12)). If the candidate charging rule Rule(13) is selected as the charging rule to be used, when any two of the battery cells 13(1) to 13(n) have a voltage difference greater than 70 mV (that is, GP(13)), the balance charging is activated so that the balance charging is performed on the battery cells 13(1) to 13(n), and this balance charging lasts for 20 seconds (that is, T(13)).

Referring to FIG. 1 and FIG. 3B, in one embodiment, it is assumed that the candidate control parameter set 22 is selected as the control parameter set to be applied. After the candidate control parameter set 22 is applied, the charging management circuit 12 compares the voltage parameter of the battery cells 13(1) to 13(n) with a plurality of threshold values TH2(21) to TH2(23), and, according to a comparison result (that is, the second comparison result), selects one of a plurality of candidate charging rules Rule(21) to Rule(23) as a charging rule of balance charging to be used. The threshold value TH2(23) is greater than the threshold value TH2(22) and the threshold value TH2(22) is greater than the threshold value TH2(21).

In one embodiment, if the second comparison result reflects that the value of the voltage parameter is between the threshold values TH2(21) and TH2(22), the charging management circuit 12 selects the candidate charging rule Rule (21) as the charging rule to be used, and charging control parameters GP(21) and T(21) are applied. In one embodiment, if the second comparison result reflects that the value of the voltage parameter is between the threshold values TH2(22) and TH2(23), the charging management circuit 12 selects the candidate charging rule Rule(22) as the charging rule to be used, and charging control parameters GP(22) and T(22) are applied. In one embodiment, if the second comparison result reflects that the value of the voltage parameter is greater than the threshold value TH2(23), the charging management circuit 12 selects the candidate charging rule Rule(23) as the charging rule to be used, and charging control parameters GP(23) and T(23) are applied.

Referring to FIG. 1 and FIG. 3C, in one embodiment, it is assumed that the candidate control parameter set 23 is selected as the control parameter set to be applied. After the candidate control parameter set 23 is applied, the charging management circuit 12 compares the voltage parameter of the battery cells 13(1) to 13(n) with a plurality of threshold values TH2(31) to TH2(33), and, according to a comparison result (that is, the second comparison result), selects one of a plurality of candidate charging rules Rule(31) to Rule(33) as a charging rule of balance charging to be used. The threshold value TH2(33) is greater than the threshold value TH2(32) and the threshold value TH2(32) is greater than the threshold value TH2(31).

In one embodiment, if the second comparison result reflects that the value of the voltage parameter is between the threshold values TH2(31) and TH2(32), the charging management circuit 12 selects the candidate charging rule Rule (31) as the charging rule to be used, and charging control parameters GP(31) and T(31) are applied. In one embodiment, if the second comparison result reflects that the value of the voltage parameter is between the threshold values TH2(32) and TH2(33), the charging management circuit 12 selects the candidate charging rule Rule(32) as the charging rule to be used, and charging control parameters GP(32) and T(32) are applied. In one embodiment, if the second comparison result reflects that the value of the voltage parameter is greater than the threshold value TH2(33), the charging management circuit 12 selects the candidate charging rule Rule(33) as the charging rule to be used, and charging control parameters GP(33) and T(33) are applied.

In some embodiments, the charging control parameters GP(21) to GP(23) and GP(31) to GP(33) also reflect the start conditions for the balance charging to be performed, and the charging control parameters T(21) to T(23) and T(31) to T(33) also reflect the execution time of the balance charging to be performed. Specific usages of the parameters may be understood with reference to the description of the embodiment of FIG. 3A, and the details are not repeated herein.

In some embodiments, the charging control parameters GP(11), GP(21) and GP(31) may be the same, the charging control parameters GP(12), GP(22) and GP(32) may be the same, and/or the charging control parameters GP(13), GP(23) and GP(33) may be the same. In some embodiments, the charging control parameters T(11), T(21) and T(31) may be the same, the charging control parameters T(12), T(22) and T(32) may be the same, and/or the charging control parameters T(13), T(23) and T(33) may be the same. It should be noted that, in practice, any charging control parameter in any charging rule can be adjusted to meet practical needs.

In some embodiments, the threshold value TH2(11) may be equal to the threshold value TH1(1), the threshold value TH2(21) may be equal to the threshold value TH1(2), and/or the threshold value TH2(31) may be equal to the threshold value TH1(3). In some embodiments, a charging rule may be defined by other types of charging control parameters, not limited to the first charging control parameter and/or the second charging control parameter.

Figure 4:
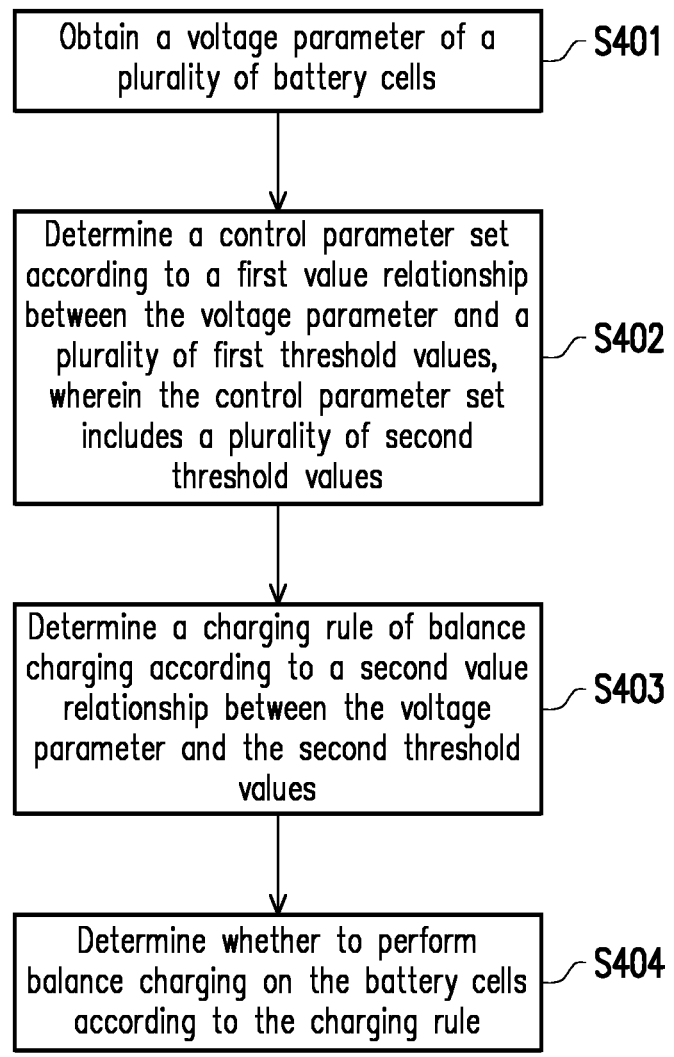
FIG. 4 illustrates a flowchart of a balance charging method according to an embodiment of the disclosure.

FIG. 4 illustrates a flowchart of a balance charging method according to an embodiment of the disclosure. Referring to FIG. 4, in step S401, a voltage parameter of a plurality of battery cells is obtained. In step S402, a control parameter set is determined according to a first value relationship between the voltage parameter and a plurality of first threshold values, wherein the control parameter set includes a plurality of second threshold values. In step S403, a charging rule of balance charging is determined according to a second value relationship between the voltage parameter and the plurality of second threshold values. In step S404, the balance charging is performed on the plurality of battery cells according to the charging rule.

The steps in FIG. 4 have been described as above and thus the details are not repeated herein. It is worth noting that the steps in FIG. 4 may be implemented as a plurality of codes or circuits, and the disclosure is not limited thereto. In addition, the method in FIG. 4 may be used in combination with the above exemplary embodiments, or may be used alone. The disclosure is not limited thereto.

In summary, in the disclosure, by setting a plurality of threshold values and a plurality of sets of control parameters, the balance charging requirements of the battery pack in various voltage states can be met. Thereby, the technical problems existing in conventional battery balancing are effectively eliminated and/or the battery life is increased.

What is claimed is:

1. A balance charging method for performing a balance charging on a plurality of battery cells, the balance charging method comprising:
    obtaining a voltage parameter of the plurality of battery cells;
    comparing the voltage parameter with a plurality of first threshold values to obtain a first comparison result, wherein the first comparison result indicates that the voltage parameter is within one of a plurality of first voltage ranges defined by the first threshold values;
    selecting, according to the first comparison result, one of a plurality of candidate control parameter sets corresponding to the one of the plurality of first voltage ranges, wherein the selected candidate control parameter set comprises a plurality of second threshold values;
    comparing the voltage parameter with the second threshold values to obtain a second comparison result, wherein the second comparison result indicates that the voltage parameter is within one of a plurality of second voltage ranges defined by the second threshold values;
    selecting, according to the second comparison result, one of a plurality of candidate charging rules corresponding to the one of the plurality of second voltage ranges; and
    performing the balance charging on the plurality of battery cells according to the selected candidate charging rule.

2. The balance charging method according to claim 1, wherein the voltage parameter reflects an average voltage of the plurality of battery cells.

3. The balance charging method according to claim 1, wherein the charging rule is defined by at least one charging control parameter, the at least one charging control parameter comprises at least one of a first charging control parameter and a second charging control parameter, the first charging control parameter reflects a start condition for the balance charging, and the second charging control parameter reflects an execution time of the balance charging.

4. A charging device, comprising:
    a charging circuit coupled to a plurality of battery cells; and
    a charging management circuit coupled to the charging circuit,
    wherein the charging management circuit is configured to obtain a voltage parameter of the plurality of battery cells,
    the charging management circuit is further configured to compare the voltage parameter with a plurality of first threshold values to obtain a first comparison result, wherein the first comparison result indicates that the voltage parameter is within one of a plurality of first voltage ranges defined by the first threshold values,
    the charging management circuit is further configured to select, according to the first comparison result, one of a plurality of candidate control parameter sets corresponding to the one of the plurality of first voltage ranges, wherein the selected candidate control parameter set comprises a plurality of second threshold values,
    the charging management circuit is further configured to compare the voltage parameter with the second threshold values to obtain a second comparison result, wherein the second comparison result indicates that the voltage parameter is within one of a plurality of second voltage ranges defined by the second threshold values,
    the charging management circuit is further configured to select, according to the second comparison result, one of a plurality of candidate charging rules corresponding to the one of the plurality of second voltage ranges, and
    the charging management circuit is further configured to control the charging circuit to perform the balance charging on the plurality of battery cells according to the selected candidate charging rule.

5. The charging device according to claim 4, wherein the voltage parameter reflects an average voltage of the plurality of battery cells.

6. The charging device according to claim 4, wherein the charging rule is defined by at least one charging control parameter, the at least one charging control parameter comprises at least one of a first charging control parameter and a second charging control parameter, the first charging control parameter reflects a start condition for the balance charging, and the second charging control parameter reflects an execution time of the balance charging.

* * * * *